United States Patent
Van Bemmelen (12)

(10) Patent No.: US 9,392,769 B2
(45) Date of Patent: Jul. 19, 2016

(54) MULTIPLE-PET LEASH

(76) Inventor: Robert James Van Bemmelen, Ypsilanti, MI (US)

( * ) Notice: Subject to any disclaimer, the term of this patent is extended or adjusted under 35 U.S.C. 154(b) by 161 days.

(21) Appl. No.: 13/018,361

(22) Filed: Jan. 31, 2011

(65) Prior Publication Data

US 2012/0192810 A1 Aug. 2, 2012

(51) Int. Cl.
*A01K 27/00* (2006.01)

(52) U.S. Cl.
CPC .................................. *A01K 27/003* (2013.01)

(58) Field of Classification Search
CPC .... A01K 27/00; A01K 27/003; A01K 27/004
USPC ......... 119/803, 804, 795, 769, 805, 797, 793, 119/787; D30/153
IPC ...................................................... A01K 27/00
See application file for complete search history.

(56) References Cited

U.S. PATENT DOCUMENTS

| 2,827,017 | A * | 3/1958 | Ryan | 119/795 |
| 4,879,972 | A * | 11/1989 | Crowe et al. | 119/792 |
| 5,709,172 | A * | 1/1998 | Maglich | 119/797 |
| 6,626,132 | B1 * | 9/2003 | Mann | 119/795 |
| 6,675,742 | B1 * | 1/2004 | Shiraki | 119/797 |
| 6,978,738 | B1 * | 12/2005 | Hurwitz | 119/793 |
| 7,325,515 | B2 * | 2/2008 | Hetland | 119/795 |
| 7,938,086 | B2 * | 5/2011 | Cobb et al. | 119/770 |
| 2006/0070584 | A1 * | 4/2006 | Larouche | 119/795 |
| 2006/0201450 | A1 * | 9/2006 | Jordan et al. | 119/796 |
| 2007/0157892 | A1 * | 7/2007 | Farrell et al. | 119/795 |
| 2009/0173289 | A1 * | 7/2009 | Cobb et al. | 119/795 |
| 2010/0083912 | A1 * | 4/2010 | Hurwitz | 119/792 |

* cited by examiner

*Primary Examiner* — Joshua Huson

(57) ABSTRACT

A multi-pet leash is provided. The multi-pet leash includes a feeder leash and two or more leader leashes connected to the feeder leash. The feeder leash comprises a first end and a second end, with the second end slidably connected onto itself to form an adjustable loop portion. Each leader leash comprises a first end slidably connected to the adjustable loop portion of the feeder leash. The second end of each leader leash is attached to an animal or pet allowing a handler to control the pets simultaneously utilizing one feeder leash.

14 Claims, 3 Drawing Sheets

MULTIPLE-PET LEASH

FIELD OF INVENTION

The present invention relates to a leash, and more particularly, to methods and apparatus for multi-pet leashes.

BACKGROUND

Many animals, such as dogs, cats and other domesticated pets, must be walked and exercised on a regular basis. Commonly, pet owners tether their pets while walking them to prevent the pets from straying or invading private areas. Pet owners with more than one pet often save time by walking multiple pets at once. This may lead to problems, however, when each pet requires its own leash.

For example, handling two or more leashes may occupy both of the pet owners hands, preventing the owner from carrying any additional items, such as materials for cleaning pet waste. Further, the leashes may easily become crossed or tangled when the pets go in different directions and cross paths. Moreover, when one pet stops and the other pet continues moving, it may become difficult for the pet owner or handler to maintain control over both pets.

Numerous specialty leashes have been developed to assist with walking a plurality of pets at once. However, each of these leash designs suffers from shortcomings. For example, retractable leashes have been designed to allow a handler to control the length of the pet's leash. Retractable leashes, however, suffer from similar problems as basic fixed length leashes that may become crossed or tangled. These leashes further include internal components and mechanisms that are prone to wear and tear. Multiple-pet fixed length leashes allow a handler to tether two pets using just one leash. However, these leashes often do not provide individual control of each pet, and thus allow the pets to both tangle and pull at one another.

Therefore, an improved leash for tethering multiple animals is needed.

SUMMARY

A multi-pet leash is provided. The multi-pet leash includes a feeder leash and two or more leader leashes connected to the feeder leash. The feeder leash comprises a first end and a second end, with the second end slidably connected onto itself to form an adjustable loop portion. Each leader leash comprises a first end slidably connected to the adjustable loop portion of the feeder leash.

BRIEF DESCRIPTION OF THE DRAWINGS

Objects and advantages together with the operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the present invention.

Figure 1:
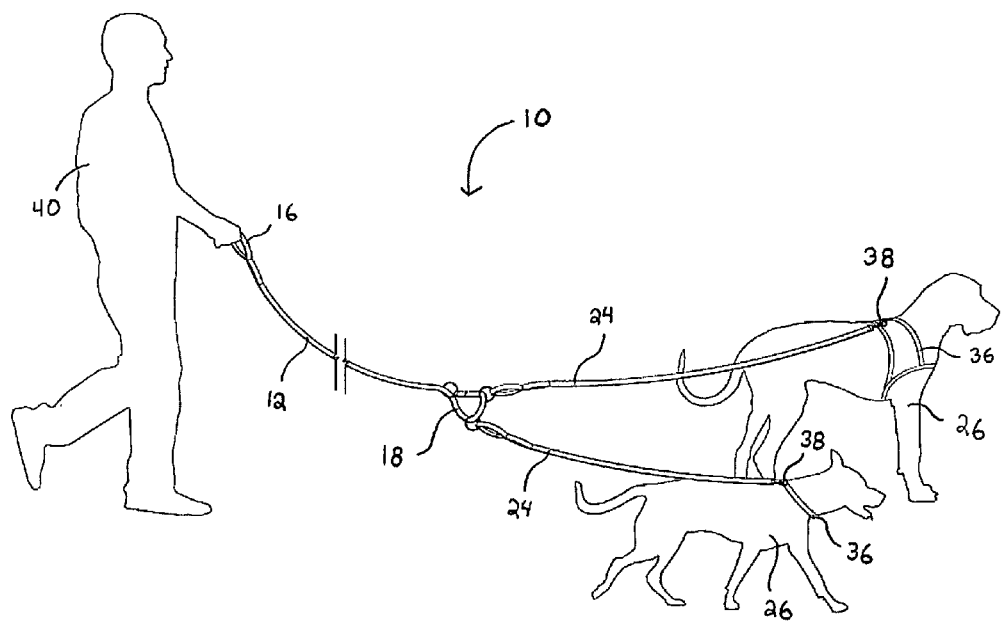
FIG. 1 illustrates a multi-pet leash connected to two animals and held by a handler.
Figure 2:
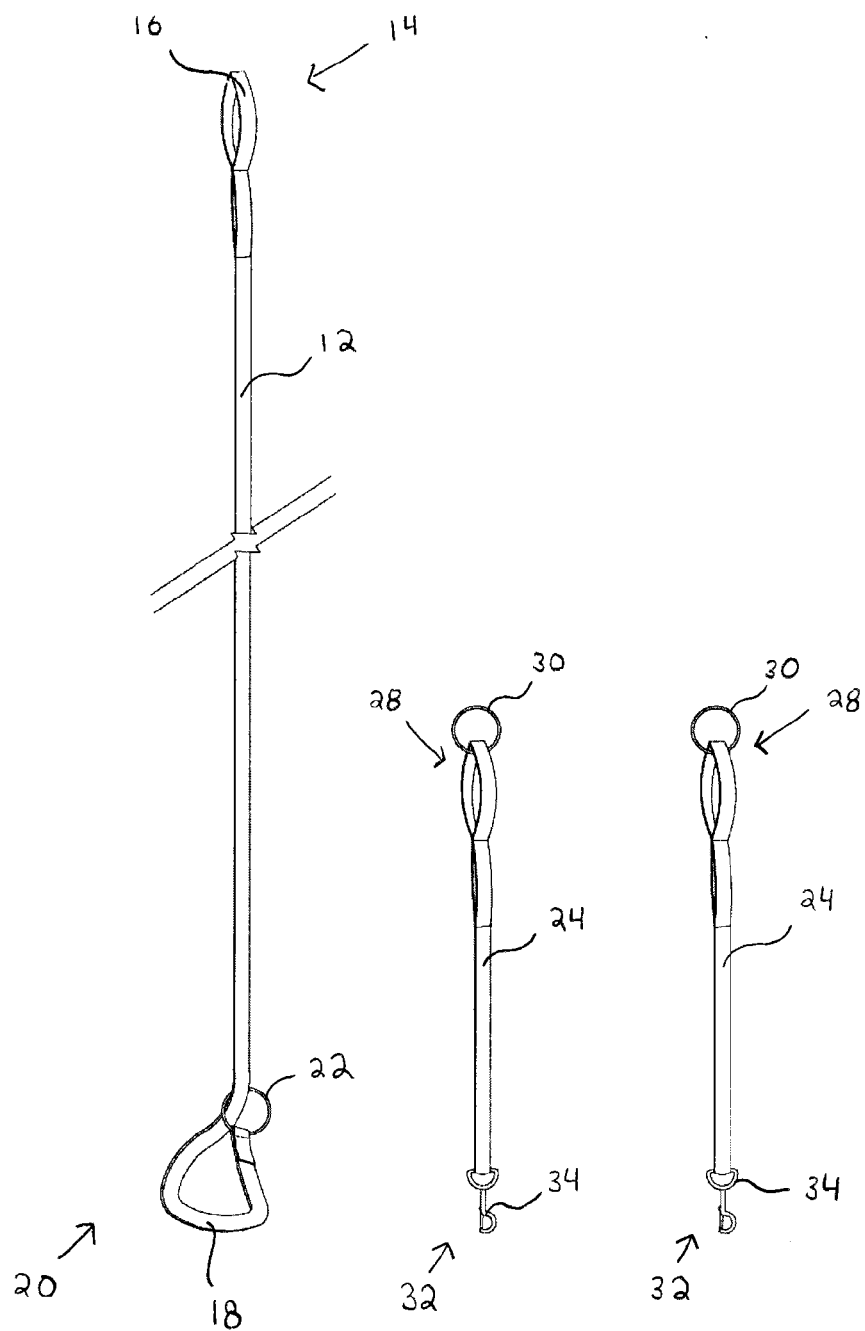
FIG. 2 illustrates three leash components of a multi-pet leash.
Figure 3:
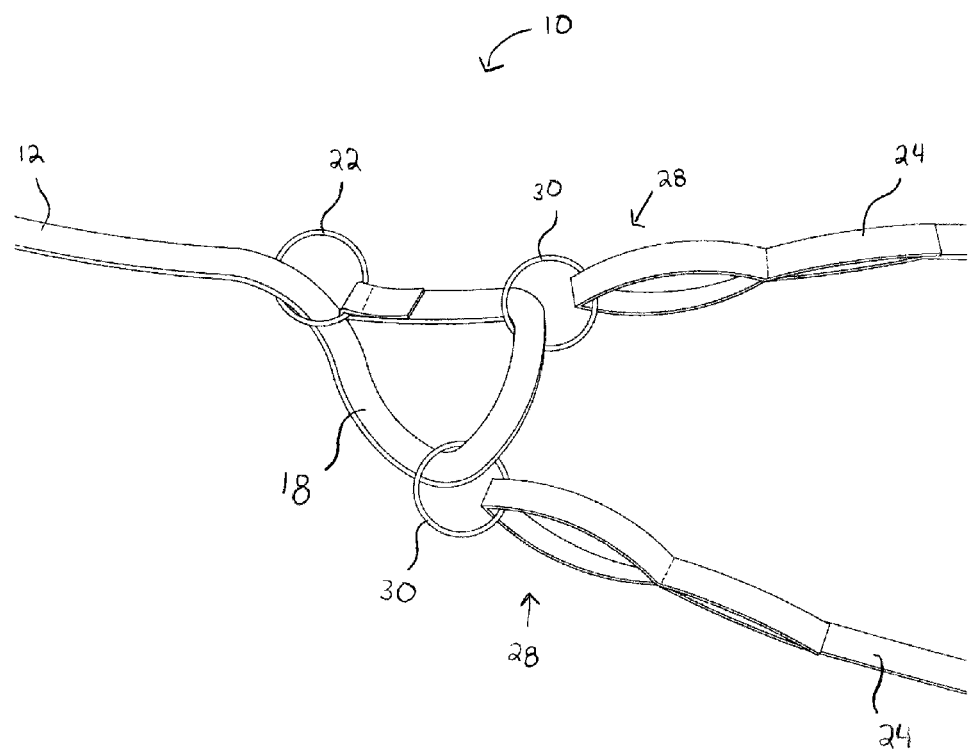
FIG. 3 illustrates the connection point of a multi-pet leash.

A multi-pet leash 10 is provided, as illustrated in FIGS. 1-3. The multi-pet leash 10 is configured to be held or controlled by a handler and provide tethering of two or more animals.

The multi-pet leash 10 includes a feeder leash 12. The feeder leash 12 may be any appropriate size and length, such as ½ inch or 1 inch wide by approximately 12-15 feet long, and may be composed of any appropriate material, such as nylon or any other fabric known in the art. The feeder leash 12 may include a first end 14 configured to be held by a handler. For example, the first end 14 may comprise a handle 16, such as a loop, grip, or other handle device.

The feeder leash 12 may include a looped portion 18 formed at its second end 20. The looped portion 18 may be any appropriate size and shape and may be adjustable in both size and shape. For example, the looped portion 18 may be formed by an adjustable connection between the second end 20 and a portion of the feeder leash 12. The adjustable connection may allow the second end 20 to slide along a length of the feeder leash 12.

In an embodiment illustrated in FIGS. 1 and 2, the second end 20 is adjustably connected to the feeder leash by way of a ring 22. The ring 22 may be any appropriate size and shape, such as sized and shaped to allow the feeder leash 12 to slide therethrough. The ring 22 may be circular, as illustrated in FIGS. 1-3, or may be ovular, square or any other appropriate shape. The ring 22 may further be composed of any appropriate material, such as metal or plastic. While the second end is shown and described as including a ring 22, it will be appreciated that the second end 20 may be adjustably connected to the feeder leash 12 without a ring 22, by utilizing a loop or other components and means known in the art.

The multi-pet leash 10 may include two or more leader leashes 24. The leader leashes 24 may be any appropriate size and length, such as ½ inch or 1 inch wide by approximately three feet long. For example, the leader leashes may be approximately ⅕ the length of the feeder leash. Each leader leash 24 may be equal length or may be its own unique length. The leader leashes 24 may be configured to interconnect the feeder leash 12 with two or more animals 26. It will further be appreciated that the multi-pet leash 10 may include two, three, or any number of leader leashes 24.

Each leader leash 24 may include a first end 28 adjustably connected to the looped portion 18. The adjustable connection may allow each leader leash 24 to slide along the looped portion 18.

In an embodiment illustrated in FIGS. 1 and 2, the first end 28 of the leader leash 24 is adjustably connected to the looped portion 18 by way of a ring 30. The ring 30 may be any appropriate size and shape, such as sized and shaped to allow the looped portion 18 to slide therethrough. The ring 30 may be circular, as illustrated in FIGS. 1-3, or may be ovular, square or any other appropriate shape. The ring 30 may further be composed of any appropriate material, such as metal or plastic. While the first end 28 of the leader leash 24 is shown and described as including a ring 30, it will be appreciated, that the first end 28 may be adjustably connected to the looped portion 18 without a ring 30, by utilizing a loop or other components and means known in the art.

Each leader leash 24 may be connected to an animal or pet 26 at a second end 32. For example, the leader leash may include a hook or clasp 34 at the second end 32 for connecting to a harness or collar 36 on the animal 26. The clasp 34 may be removably connectable to the collar 36.

In an embodiment, a harness 36 is positioned on the body of the animal 26. The harness 36 is secured to the animal 26 to prevent rotation or slipping with respect to the body of the animal 26. The harness 36 may include a leash connection point 38 at an appropriate position, such as at the top of the harness 36. The top connection point 38 may be fixed to prevent the leader leash 24 from becoming tangled with the animal's legs during use.

In use, two or more leader leashes 24 may be slidably connected to the second end 20 of the feeder leash 12. The second end 20 of the feeder leash 12 may be slidably connected to itself to form an adjustable loop portion 18. Each leader leash 24 may be connected to a collar or harness 36 on an animal 26 by way of a clasp 34.

The feeder leash 12 may be held by a handler 40. The handler 40 may control each animal 26 by managing the length and amount of slack in the feeder leash 12. For example, the handler 40 may allow slack in the feeder leash 12, thereby enlarging the looped portion 18 and allowing the animals 26 to roam. The handler 40 may also rein in the animals 26 by pulling on the leader leash and tightening the slack to reduce the size of the looped portion 18 and thereby restrain the animals from freely roaming.

The invention has been described above and, modifications and alterations will occur to others upon a reading and understanding of this specification. The claims as follows are intended to include all modifications and alterations insofar as they come within the scope of the claims or the equivalent thereof.

What I claim is:

1. A multi-pet leash comprising:
   a feeder leash having a first end and a second end slidably connected onto itself to form an adjustable loop portion;
   a first leader leash having a first end slidably connected to said adjustable loop portion of said feeder leash and a second end comprising a clasp connected to a first collar assembly, said first collar assembly being worn by a first animal, wherein said first collar assembly of the first animal is releasably secured to the body of the first animal;
   a second leader leash having a first end slidably connected to said adjustable loop portion of said feeder leash and a second end comprising a clasp connected to a second collar assembly, said second collar assembly being worn by a second animal, wherein said second collar assembly of the second animal is releasably secured to the body of the second animal; and
   wherein said adjustable loop portion is expandable in response to opposing forces applied to said first and second leader leashes to allow said first and second leader leashes to roam with respect to one another, and further wherein the adjustable loop portion is contractible in response to a force applied to the feeder leash away from the first animal and second animal to bring the first and second animals into closer proximity to one another.

2. The multi-pet leash of claim 1, wherein said collar comprises a harness having a fixed leash connection point.

3. The multi-pet leash of claim 2, wherein said fixed leash connection point is located on a top side of said harness.

4. The multi-pet leash of claim 1, wherein said leash is comprised of nylon.

5. The multi-pet leash of claim 1, wherein said feeder leash is slidably connected onto itself by way of a ring.

6. The multi-pet leash of claim 5, wherein said ring is circular.

7. The multi-pet leash of claim 5, wherein said ring is square.

8. The multi-pet leash of claim 1 further comprising a handle loop at said first end of said feeder leash.

9. The multi-pet leash of claim 1, wherein said first end of said first leader leash is slidably connected to said loop portion by a ring.

10. The multi-pet leash of claim 9, wherein said ring is circular.

11. The multi-pet leash of claim 9, wherein said ring is square.

12. The multi-pet leash of claim 1, wherein said the length of said first leader leash is approximately equal to one fifth of the length of said feeder leash.

13. The multi-pet leash of claim 1, wherein the length of said first leader leash is approximately equal to the length of said second leader leash.

14. A method of controlling two animals comprising:
   providing a feeder leash having a first end and a second end slidably connected onto itself to form an adjustable loop portion;
   providing a first leader leash having a first end slidably connected to said adjustable loop portion of said feeder leash and a second end having a first clasp;
   providing a second leader leash having a first end slidably connected to said adjustable loop portion of said feeder leash and a second end having a second clasp;
   connecting the first clasp of the first leader leash to a first collar assembly wherein said first collar assembly is attached to a first animal, wherein said first collar assembly of the first animal is releasably secured to the body of the first animal;
   connecting the second clasp of said second leader leash to a second collar assembly wherein said second collar assembly is attached to a second animal, wherein the second collar assembly of the second animal is releasably secured to the body of the second animal;
   applying a force to the feeder leash in a direction away from the first and second animal, in response to the first and second animal moving away from one another and expanding said adjustable loop, wherein the force applied to the feeder leash contracts the adjustable loop to bring the first and second animals in closer proximity to one another.

* * * * *